United States Patent
Jonsson

(10) Patent No.: US 11,283,271 B2
(45) Date of Patent: Mar. 22, 2022

(54) DETECTING WHETHER MALFUNCTIONING OR SWITCHED OFF CHARGING UNIT IS PHYSICALLY CONNECTED TO BATTERY SYSTEM OF VEHICLE

(71) Applicant: ALELION ENERGY SYSTEMS AB, Gothenburg (SE)

(72) Inventor: Magnus Jonsson, Billdal (SE)

(73) Assignee: ALELION ENERGY SYSTEMS AB, Gothenburg (SE)

( * ) Notice: Subject to any disclaimer, the term of this patent is extended or adjusted under 35 U.S.C. 154(b) by 5 days.

(21) Appl. No.: 16/966,946

(22) PCT Filed: Jan. 31, 2019

(86) PCT No.: PCT/SE2019/050077
§ 371 (c)(1),
(2) Date: Aug. 3, 2020

(87) PCT Pub. No.: WO2019/156611
PCT Pub. Date: Aug. 15, 2019

(65) Prior Publication Data
US 2021/0046847 A1  Feb. 18, 2021

(30) Foreign Application Priority Data
Feb. 8, 2018 (SE) .................................... 1850139-5

(51) Int. Cl.
*H02J 7/00* (2006.01)
*B60L 53/53* (2019.01)
(Continued)

(52) U.S. Cl.
CPC ............ *H02J 7/0029* (2013.01); *B60L 53/53* (2019.02); *B60L 58/22* (2019.02); *H02J 7/0036* (2013.01);
(Continued)

(58) Field of Classification Search
CPC .. H02J 7/0029; H02J 7/0036; G08B 13/1418; B60L 53/16; Y02T 90/12; G01R 31/66
See application file for complete search history.

(56) References Cited

U.S. PATENT DOCUMENTS 9,923,391 B2 * 3/2018 Suzuki .................... B60L 53/66
10,243,394 B2 * 3/2019 Steinbuchel, IV ........ B60L 3/04
(Continued)

FOREIGN PATENT DOCUMENTS

EP    3 070 810 A1    9/2016
JP    11027875 A  *  1/1999
(Continued)

OTHER PUBLICATIONS

International Search Report, issued in PCT/SE2019/050077, dated Mar. 22, 2019.
(Continued)

*Primary Examiner* — Naum Levin
(74) *Attorney, Agent, or Firm* — Birch, Stewart, Kolasch & Birch, LLP

(57) ABSTRACT

In a method of determining whether a battery system arranged onto a vehicle is connected to an external battery charging unit, the battery system includes a plurality of battery cells, first and second main terminals connected to the battery cells, and a charging interface including first and second contact points connected to corresponding first and second main terminals. The charging unit includes third and fourth contact points configured to be connected to the first and second contact points during charging of the battery system. The method includes disconnecting, by means of a switch, the first main terminal from the corresponding first contact point; measuring a voltage between the first contact point and a reference point having a potential substantially similar to the disconnected first main terminal; and determining, by comparing a value from the voltage measure-
(Continued)

ment to a threshold value, whether the charging unit is connected to the battery system.

20 Claims, 4 Drawing Sheets

(51) Int. Cl.
    *B60L 58/22*     (2019.01)
    *G08B 13/14*     (2006.01)

(52) U.S. Cl.
    CPC ........ *H02J 7/0048* (2020.01); *G08B 13/1418* (2013.01)

(56) References Cited

U.S. PATENT DOCUMENTS

| | | | | |
|---|---|---|---|---|
| 10,802,083 | B2* | 10/2020 | Berman | ................. G01R 31/58 |
| 2010/0295680 | A1 | 11/2010 | Dumps | |
| 2012/0025842 | A1 | 2/2012 | Gibbs et al. | |
| 2013/0320920 | A1 | 12/2013 | Jefferies et al. | |
| 2014/0312685 | A1 | 10/2014 | Moga | |
| 2015/0303737 | A1* | 10/2015 | Steinbuchel, IV | ...... B60L 53/18 320/109 |
| 2016/0241060 | A1* | 8/2016 | Suzuki | ................... B60L 53/66 |

FOREIGN PATENT DOCUMENTS

| | | | |
|---|---|---|---|
| JP | 2009-136110 A | | 8/2009 |
| JP | 2012170217 A | * | 9/2012 |
| WO | WO 2017/121748 A1 | | 7/2017 |

OTHER PUBLICATIONS

Written Opinion of the International Searching Authority, issued in PCT/SE2019/050077, dated Mar. 22, 2019.

Supplementary European Search Report for European Application No. 19751796, dated Oct. 8, 2021.

\* cited by examiner

S1 Activating switch

S2 Measuring voltage

S3 Determining connection

S4 Limiting power

Fig. 4

DETECTING WHETHER MALFUNCTIONING OR SWITCHED OFF CHARGING UNIT IS PHYSICALLY CONNECTED TO BATTERY SYSTEM OF VEHICLE

TECHNICAL FIELD

The invention relates to the field of battery charging in electric vehicles. More precisely, the invention relates to a battery system arranged onto a vehicle and a method of detecting a charging unit being connected to a battery system arranged onto a vehicle.

BACKGROUND OF THE INVENTION

When charging a battery of an electric vehicle using an external stationary charging unit it is important to avoid driving away with the charging unit still connected as this is likely to damage the electronic equipment and it might also cause a hazard (fire, electric shock, etc.). During charging it is typically easy to automatically detect the presence of a connected charger since the power delivered to the battery is easy to detect. Also, most modern chargers are typically arranged to communicate with a battery management system (BMS) so the presence of a connected charger can normally be detected also when charging is completed or has not started, i.e. when no power is delivered to the battery.

However, in cases where charging does not occur and where there is no communication between the charger and the BMS, for instance because the charger or a power source arranged to deliver power to the charger is out of order, or the charger is not provided with any communication means, it is difficult to automatically detect the presence of a connected charger unit.

WO 2013/181147 describes an electric vehicle supply equipment for charging an electric vehicle where the supply equipment includes a cable detection subcircuit for detecting whether the cable has been removed, in particular for the purpose of preventing theft. This solution may be suitable for its intended purpose but may not function properly for a charger that is out of power. In addition, it requires an additional line for detecting the presence of a cable, in addition to the lines for the positive and negative poles of the battery.

There is thus a need for improved automatic detection of whether a malfunctioning or switched off charging unit is physically/mechanically connected to a battery system of a vehicle. This can be used to activate various systems for preventing driving away of the vehicle with the charger unit still connected.

SUMMARY OF THE INVENTION

An object of the invention is to provide a reliable, simple and cost-effective solution for detecting whether a charging unit is connected to a battery system attached to a vehicle.

According to a first aspect of the invention, this and other objects are achieved by a method of determining whether a battery system arranged onto a vehicle is connected to an external battery charging unit, wherein the battery system comprises a plurality of battery cells, first and second main terminals connected to the battery cells, and a charging interface comprising first and second contact points connected to corresponding first and second main terminals, wherein the charging unit comprises third and fourth contact points configured to be connected to the first and second contact points, respectively, during charging of the battery system, and wherein the charging unit further comprises an impedance connecting the third and fourth contact points. The method comprising the steps of: disconnecting, by means of a switch, the first main terminal from the corresponding first contact point; measuring a voltage between the first contact point and a reference point having a potential substantially similar to the disconnected first main terminal; and determining, by comparing a value from the voltage measurement to a threshold value, whether the charging unit is connected to the battery system.

This method requires only relatively non-complex electronic components and enables a reliable and quick determination of whether there is a malfunctioning, switched off or in other ways deactivated or electrically "dead" charging unit connected to the battery system. If there is no charging unit connected to the battery system and if the first main terminal and the first contact point relate to the main negative (ground) terminal and if the reference point is ground (or, alternatively, if the first main terminal and the first contact point relate to the main positive terminal and if the reference point is the main positive terminal), the voltage between the first contact point and the reference point will be 0 V or close to 0 V. On the other hand, if there is a "dead" charging unit connected to the same battery system, the measured voltage will show the voltage between the main positive terminal and ground (or, alternatively, the voltage between the main positive terminal and the main negative terminal) over the impedance between the third and fourth contact points of the charging unit. This voltage will be significantly more than 0 V (unless all battery cells are completely discharged or there is some other general problem with the battery, which, however, are faults that can be detected by an ordinary BMS). By setting the threshold value to, for instance, 50% of the battery's normal voltage that may be e.g. around 50 V depending on the particular battery system used and comparing the measured voltage with the threshold value, it can be determined whether the charging unit is connected.

The impedance may be a resistor with a resistance that is sufficiently high to avoid influencing the normal charging operation of the charging unit. The resistance may be in the order of 100 kOhm but may be lower or higher depending on the voltage output of the charging unit.

This automatic determination of whether the charging unit is connected can be used for automatic prevention of the vehicle being driven away with the charging unit connected, thus preventing potential hazardous and damaging situations. It is for instance possible to automatically activate some kind of warning sign on the vehicle and/or to prevent driving of the vehicle (e.g. by disconnecting the battery system from an electric motor used for driving the vehicle).

Compared to the solution in WO 2013/181147, the invention provides a way of reliably detecting presence of a charging unit without the need for lines other than the primary power lines in the interface between battery system and battery charging unit.

The step of determining whether the charging unit is connected to the battery system may comprise determining that the charging unit is connected to the battery system if the value from the voltage measurement exceeds the threshold value. The threshold value may be dependent on the charge level of the battery cells in the battery system. The voltage values measured when a charging unit is connected will depend on the charge level of the battery system. Thus, the threshold value that the measured voltage value is compared to may depend on the charging level of the battery system.

The method may further comprise a step of limiting the ability of the battery system to provide power to the vehicle if it is determined that the charging unit is connected to the battery system. By limiting the power output to the vehicle when a charging unit, for instance in the form of a charge connector, is attached it can be ensured that the vehicle cannot be driven away and cause harm by breaking the cable to the charging unit or cause other damage.

The step of limiting the ability of the battery system to provide power to the vehicle may include controlling a switch in a connection between the battery system and the vehicle. The switch may then be switched to a break in the connection when a charging unit is connected to prevent the vehicle from moving with charging unit connected.

Prevention of propulsion of the vehicle may alternatively be achieved by sending a control signal from the battery system to the vehicle with instructions to not allow propulsion of the vehicle. This solution still enables power to be provided to other functions in the vehicle, while preventing propulsion.

The method may further comprise a step of indicating to a user of the vehicle whether the charging unit is connected to the battery system. By indicating to a user of the vehicle, for instance by a flashing indication light, the driver can be alerted of the charging unit being connected and thereby driving of the vehicle with connected charging unit may be prevented.

The step of switching to a complete break between the first main terminal and the first contact point of the charging interface may comprise switching to a connection between the first main terminal and a first contact point of a loading interface, the loading interface being configured to provide power from the battery system to the vehicle. By switching from a charging interface to a loading interface it can be avoided that loading and charging is done simultaneously to increase control of operation.

The battery system may be arranged to provide electric power for propulsion of the vehicle. By limiting the ability of the battery system to provide power for propulsion of the vehicle if a charging unit is connected driving of the vehicle can be prevented.

The vehicle may be a forklift. The forklift may serve the purpose of for instance material handling at an industrial storage site. The battery system may comprise lithium-ion battery cells, or any other types of battery cells.

According to a second aspect of the invention, there is provided a battery system, wherein the battery system comprises a plurality of battery cells, first and second main terminals connected to the battery cells, and a charging interface comprising first and second contact points connected to corresponding first and second main terminals, wherein the battery system is arranged onto a vehicle and configured to be connected via the first and second contact points to an external battery charging unit for charging of the battery system, wherein the battery system comprises a switch arranged between the first main terminal and the corresponding first contact point so as to allow disconnection of the first contact point from the first main terminal, wherein the battery system is provided with a voltage measurement member arranged to measure a voltage between the first contact point and a reference point having a potential substantially similar to the disconnectable first main terminal, wherein the battery system comprises a battery management circuitry arranged to control the switch and to receive a signal from the voltage measurement member, wherein the battery management circuitry is configured to determine, by comparing a value from the voltage measurement to a threshold value, whether the charging unit is connected to the first and second contact points of the battery system.

This battery system enables performance of the method according to the first aspect of the invention.

This battery system enables for detection of whether a charging unit is connected based solely on a voltage measurement in the circuit.

The battery management circuitry may be arranged to open the switch and to receive a signal from the voltage measurement member when the switch is open. By measuring the voltage when the switch is open the measured value will mainly depend on the connection between the first and second contact point, i.e. whether the first and second contact points are connected via the resistor/impedance or not.

The battery management circuitry may further be configured to limit the ability of the battery system to provide power to the vehicle if it is determined that a charging unit is connected to the battery system. By limiting the power output to the vehicle when a charging unit, for instance in the form of a charge connector, is attached it can be ensured that the vehicle cannot be driven away and cause harm by breaking the cable to the charging unit or cause any other damage.

For instance, the battery management circuitry may be configured control a switch in an interface between the battery system and the vehicle to enable or disable power from the battery system to the vehicle based on whether it is determined that a charging unit is connected.

The battery management circuitry may further be configured to indicate to a user of the vehicle that the charging unit is connected to the battery system. By indicating to a user of the vehicle, for instance by an indication light, the driver can be alerted of the charging unit being connected and thereby driving of the vehicle with connected charging unit may be prevented.

In an embodiment the first main terminal is the negative main terminal and the reference point is ground. The voltage measurement member is thus connected to ground.

In another embodiment the first main terminal is the positive main terminal and the reference point is the positive main terminal. The voltage measurement member is thus connected to the positive main terminal (instead of to the ground).

The battery system may be arranged to provide electric power for propulsion of the vehicle. By limiting the ability of the battery system to provide power for propulsion of the vehicle when a charging unit is connected damages caused to battery, charger or vehicle caused by driving the vehicle with connected charging unit can be prevented. For instance, cables in connection to the charging unit are likely to break if the charging unit is connected to the vehicle while the vehicle is driven.

The vehicle may be a forklift. The forklift may serve the purpose of for instance material handling at an industrial storage site. The battery system may comprise lithium-ion battery cells, or any other type of rechargeable battery cells. The battery system may include a number of battery cells arranged in series, a number of battery cells arranged in parallel or a number of battery cells arranged in series and parallel.

According to a third aspect of the invention, there is provided a battery charging system comprising a battery system of the above type and a battery charging unit comprising third and fourth contact points configured to be connected to the first and second contact points, respectively, during charging of the battery system, wherein the charging unit further comprises an impedance connecting the third and fourth contact points.

The impedance may be a separate component or form a more or less integrated component of other parts of the charging unit, such as a power/voltage source.

The impedance may be a resistor. Such a resistor may have a resistance in the order of 100 kOhm.

Battery charging unit here generally refers to the unit connected to the charging interface of the battery system during charging of the battery system. This unit can for instance be a charge connector that is to be directly attached to a charging interface, with one or a plurality of cables connected between the charge connector and a power supply unit. It shall however be noted that charging units of many different physical appearances can be used according to the invention.

According to a fourth aspect of the invention, there is provided a vehicle comprising a battery system of the above type, wherein the battery system is arranged to provide electric power for propulsion of the vehicle. The vehicle may be a forklift.

BRIEF DESCRIPTION OF DRAWINGS

In the description of the invention given below reference is made to the following figure, in which:

FIG. 4 is a flow chart of a method of detecting a state of connection between a charging unit and a battery system according to an embodiment of the invention.

DESCRIPTION OF EXAMPLE EMBODIMENTS OF THE INVENTION

Figure 1:
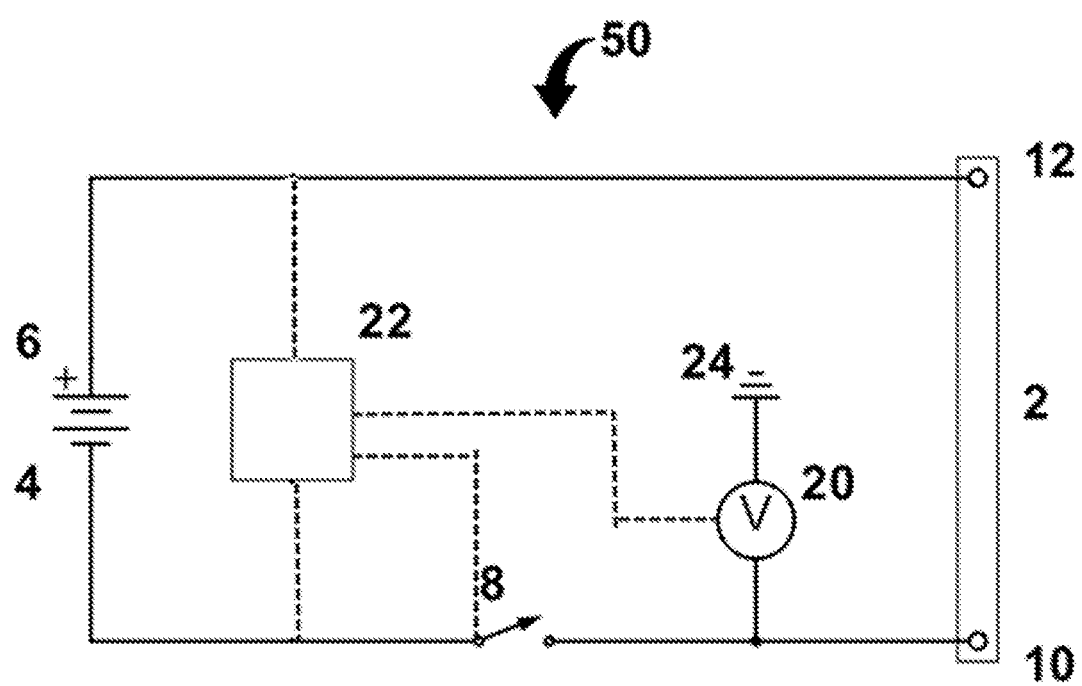
FIG. 1 is a schematic illustration of an example configuration for a battery system according to an embodiment of the invention.

FIG. 1 shows a schematic view of an example configuration for a battery system 50 arranged to power an electric motor (not shown) for propulsion of an electric vehicle (not shown) according to an embodiment of the invention. Two main terminals 4, 6 of the battery system 50 are connected to a plurality of battery cells (not shown) and are configured to be able to be electrically connected to two contact points 10, 12 of a charging interface 2. The main terminals 4, 6 have opposite polarity. A first 4 of the two main terminals has negative polarity and is connected through a switch 8 to a first 10 of the two contact points of the charging interface 2. A second 6 of the two main terminals has positive polarity and is connected to a second 12 of the two contact points of the charging interface 2.

A battery management circuity 22 is arranged to be electrically powered from the terminals 4, 6 of the battery system 50. The battery management circuitry 22 is connected to a voltmeter 20 that is arranged to measure an electrical potential between a measurement point and a reference point that in this embodiment is ground 24, wherein the measurement point is on the connection between the switch 8 and the first contact point 10 so that the voltmeter 20 can measure a voltage potential between the first contact point 10 and ground 24. The battery management circuity 22 is further configured to determine if there is a charging unit connected to the contact points of the charging interface 2 by comparing the measured electrical potential to a threshold value. Dashed lines indicate connections to the battery management circuitry 22. The circuitry 22 can be regarded to form a battery management system (BMS) or a part thereof.

During charging the switch 8 is closed to provide a power line between the first main terminal 4 and the first contact point 10 of the charging interface 2. A charging unit would during charging connect to the two contact points 10, 12 through a power supply for charging the battery system. However, when not charging, the switch 8 is instead open to provide a break between the first main terminal 4 and the first contact point 10.

As an alternative, the switch 8 can be placed on the positive side of the battery system, i.e. between the positive main terminal 6 and the second contact point 12, so as to instead allow disconnection of the positive main terminal 6. In that case the voltmeter 20 is connected to the positive terminal 6 instead of to ground, which means that the voltage is measured between the second contact point 12 and the positive main terminal 6, which thus forms the reference point in this alternative embodiment. When no charging unit is connected the voltage will be 0 V, and when the charging unit is connected the voltage between the main terminals 4, 6 will be measured (via the charging unit).

It should be noted that FIG. 1 does not show all components of the connection circuit in the battery system, but instead focuses on the basic components of interest for the invention. There can thus be a number of additional components and impedances present in the circuit.

The battery system 50 here refers to the system of battery cells (not shown), main terminals 4, 6, contact points 10, 12, switch 8, voltmeter 20, battery management circuitry 22 and charging interface 2. The structure in the battery system may for instance be a plurality of battery cells connected in series and/or parallel arranged together with battery management circuitry and a charging interface in a battery compartment of the electric vehicle. Alternatively, the charging interface may be arranged in a second location in or on the electric vehicle as to be easily accessible for charging from outside of the electric vehicle.

Figure 2:
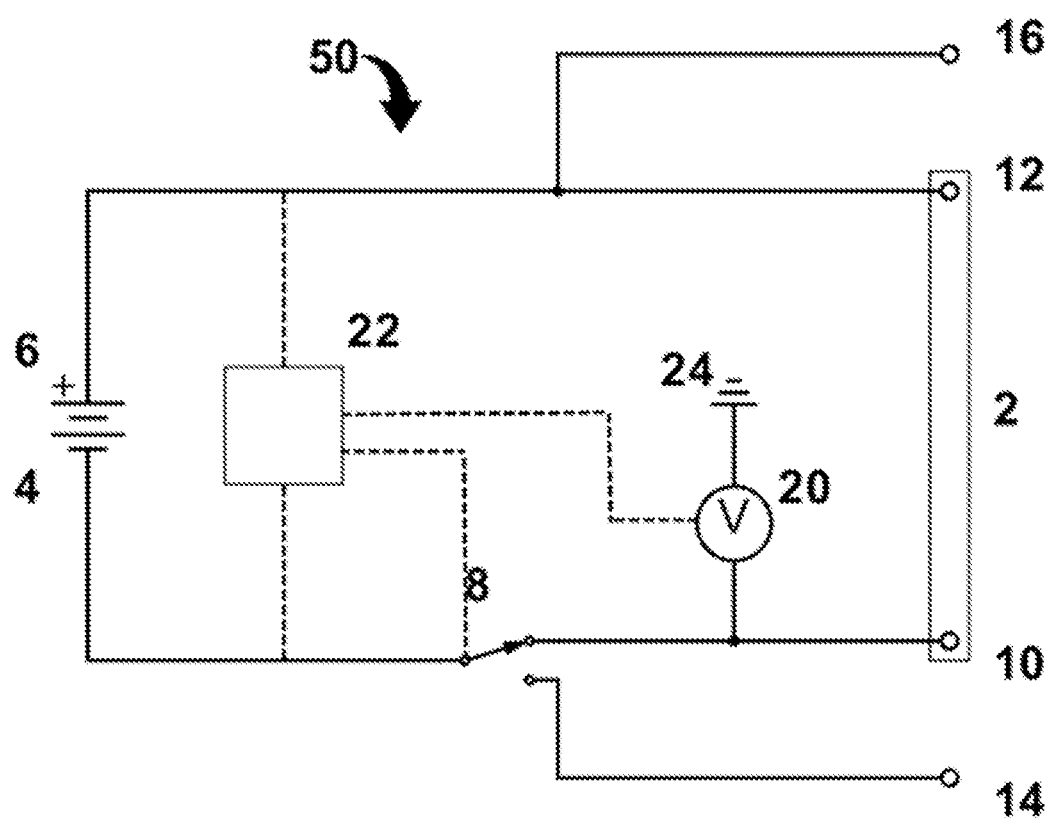
FIG. 2 is a schematic illustration of an example configuration for a battery system according to another embodiment of the invention.

FIG. 2 shows an alternative embodiment of the battery system shown in FIG. 1. The switch 8 can in this case provide an electrical connection to either the negative contact point 10 of the charging interface 2 or to a negative contact point 14 for providing power to the electric vehicle. The second power line from the second, positive main terminal 6 electrically connects the main terminal 6 to the positive contact point 12 of the charging interface 2 as well as to a positive contact point 16 for providing power to the electric vehicle.

During charging the switch 8 is set as shown in FIG. 2 to provide a power line between the negative main terminal 4 and the negative contact point 10 of the charging interface 2. A charging unit 30 would under charging connect to the two contact points 10, 12 through a power supply for charging the battery system 50. However, when not charging, the switch 8 is set to instead provide a power line between the negative main terminal 4 and the contact point 14 for providing power to the electric vehicle.

Still referring to FIG. 2, two separate switches could alternatively be used for switching for the connections to provide a power line to the contact point 10 of the charging interface 2 and to provide a power line to the contact point 14 for providing power to the electric vehicle.

The switch 8 is controlled by the battery management circuitry 22 and may for instance be set based on a sensed power being provided to the charging interface 2. Switching between a state of charging the battery system 50 and a state of providing power to the electric vehicle is merely one of the ways in which the circuit may be constructed. A simplified solution similar to that in FIG. 1 may include only one switch to break the connection between the negative terminal and the negative contact point (or the positive terminal and contact point) of the charging interface, while connection to provide power to the electric vehicle is independent of this circuit. However, a solution comprising switching from a state of charging to a state of loading provides control that charging of the battery system and driving of the electric vehicle is not simultaneous.

Referring to both FIG. 1 and FIG. 2, a voltage measurement member in the form of a voltmeter 20 is in this example provided on the power line connected to the negative contact point 10 of the charging interface 2. The voltage sensor 20 is configured to measure a potential difference between the first contact point 10 and ground 24. The measured voltage is analysed by battery management circuity to determine if there is a charging unit connected to the contact points 10, 12 of the charging interface 2.

Figure 3:
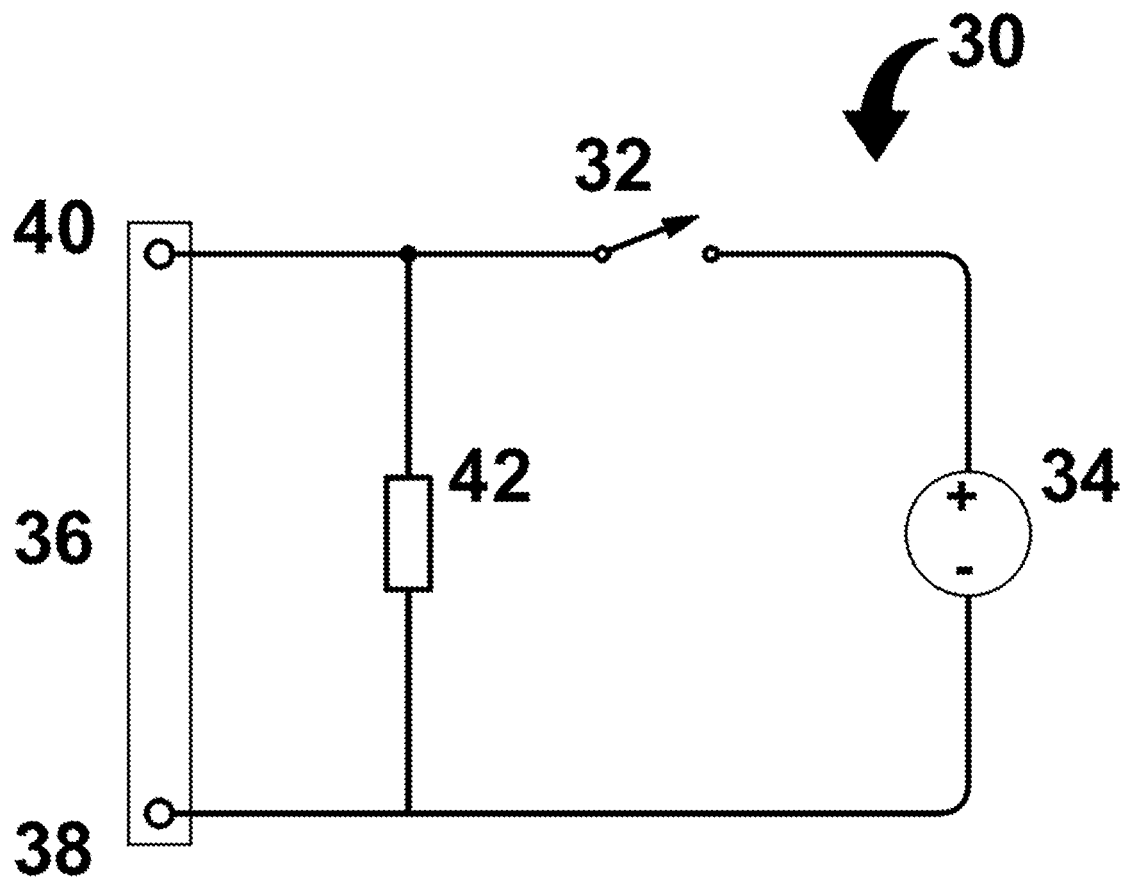
FIG. 3 is a schematic and abstract illustration of the function of a charging unit for charging a battery system according an embodiment of the invention.

FIG. 3 shows a schematic and abstract illustration of the function of a charging unit 30 for charging a battery system such as the systems shown in FIGS. 1 and 2. The charging unit 30 has an interface 36 comprising third and fourth contact points 38, 40 adapted to be connected to first and second contact points 10, 12 of the charging interface 2 of the battery system 50.

FIG. 3 further shows an impedance 42 in the form of a resistor that connects the third and fourth contact points 38, 40. The resistance of the resistor must be sufficiently high to allow normal charging operation of the charging unit 30. A resistance of around 100 kOhm may be sufficient for many applications.

FIG. 3 also shows a second switch 32, that is open, and charging unit power electronics 34 that provides the power delivered to the battery system 50 during charging. The power electronics 34 is in turn connected to a primary power source (not shown). The switch 32 is not a necessary separate component but is included in the figure to indicate the function of the charging unit 30 in a situation where it is malfunctioning or "dead", e.g. where the power source 34 cannot provide any charging power and communication between the charging unit 30 and the battery system 50 is disabled. The open second switch 32 symbolises that, in such a situation, the third and fourth contact points 38, 40 are connected only via the resistor 42. As mentioned previously, it is in this type of situations the invention is particularly useful. The impedance/resistor 42 may in practice be integrated in or be arranged in connection to the power electronics 34.

What is not shown in FIGS. 1-3 is that both the battery system 50 and the charging unit 30 normally is provided with communication means configured to allow communication between the (BMS of the) battery system 50 and the charging unit 30 when connected to each other via the charging interfaces 2, 36).

If the charging unit 30 is not connected to the battery system 50, the voltage measured by the voltmeter 20 will be 0 V. If a "dead" charging unit 30 according to FIG. 3 is connected to the battery system 50 the voltmeter 20 will measure the voltage over the resistor 42 between the main positive terminal 6 and ground 24 in the connection including the first contact point 10. This voltage will not be 0 V but rather close to the normal voltage of the battery system 50, for instance 48 V. By setting the threshold to e.g. 50% of the normal voltage of the battery system 50, it can be determined whether the charging unit 30 is connected. This applies also to the "mirror reversed" alternative where the switch 8 and voltmeter 20 are arranged on the positive side (and where the voltmeter 20 is not connected to ground 24 but to the main positive terminal 6).

FIG. 4 shows a flow chart of an example of a method of detecting a state of connection between the charging unit according to FIG. 3 and the two contact points 10, 12 of the charging interface 2 of the battery system according to FIG. 1 or 2. The method here comprises a first step S1 of activating a switch from a state of charging to create a break in a power line (which in this example is the negative power line) between the first main terminal 4 of the battery system 50 and the first contact point 10 of the charging interface 2 of the battery system 50. Alternatively to creating a complete break, the switch may switch to an alternative connection between the main terminal and the contact point, which alternative connection has significantly higher resistance than the original connection. The first step S1 may be initiated by a previous step where it for instance has been determined that there is no functioning communication between the battery system 50 and the charging unit 30.

The method further comprises a second step S2 of measuring voltage at the aforementioned contact point 10 of the charging interface 2. The voltage sensor 20 may monitor the voltage continuously when the battery system is not charging, which may for instance be when the switch 8 is set to increase resistance or break the connection between the aforementioned main terminal and the aforementioned contact point.

Furthermore, the method comprises a third step S3 of determining whether the charging unit 30 is connected to the two contact points 10, 12 of the charging interface 2 of the battery system 50 by comparing the measured voltage to at least one threshold value. If the measured voltage value exceeds the threshold value it is determined that the charging unit 30 is connected to the charging interface 2. If the measured voltage does not exceed the threshold value it is determined that no charging unit is connected to the charging interface.

The method also comprises a fourth step S4 of limiting the ability of the battery system 50 to provide power for the propulsion of the electric vehicle. This step is performed if it is determined that the charging unit 30 is connected to the charging interface 2. The limitation may for instance be to completely stop providing power to the electric vehicle, alternatively simply a limitation as to how much power can be provided to the electric vehicle to provide propulsion. Limiting the power may decrease the risk of the electric vehicle being driven with a charging unit attached to the charging interface.

The step of limiting the ability of the of the battery system to provide power to the electric vehicle may include controlling a further switch, in a connection between the battery system and the electric vehicle.

Prevention of propulsion of the electric vehicle may alternatively be achieved by sending a control signal from the battery system to the electric vehicle with instructions to not allow propulsion of the electric vehicle. This solution still enables power to be provided to other functions in the electric vehicle, while preventing propulsion.

Alternatively or supplementary to the step of limiting the ability of the battery system to provide power for the propulsion of the electric vehicle, there may be a step (not shown) of indicating to a driver of the electric vehicle that a charging unit is attached to the electric vehicle. This indication may for instance be in the form of a flashing indication light or a beeping audio signal for alerting the driver.

The invention is not limited by the embodiments described above but can be modified in various ways within the scope of the claims.

The invention claimed is:

1. A method of determining whether a battery system arranged onto a vehicle is connected to an external battery charging unit,
    wherein the battery system comprises a plurality of battery cells, first and second main terminals connected to the battery cells, and a charging interface comprising first and second contact points connected to corresponding first and second main terminals,
    wherein the external battery charging unit comprises third and fourth contact points configured to be connected to the first and second contact points, respectively, during charging of the battery system, and
    wherein the charging unit further comprises an impedance connecting the third and fourth contact points,
    the method comprising the steps of:
    disconnecting, by means of a switch, the first main terminal from the corresponding first contact point;
    measuring a voltage between the first contact point and a reference point having a potential substantially similar to the disconnected first main terminal; and
    determining, by comparing a value from the voltage measurement to a threshold value, whether the charging unit is connected to the battery system.

2. The method according to claim 1, wherein the step of determining whether the charging unit is connected to the battery system comprises determining that the charging unit is connected to the battery system if the value from the voltage measurement exceeds the threshold value.

3. The method according to claim 1, further comprising a step of limiting the ability of the battery system to provide power to the vehicle if it is determined that the charging unit is connected to the battery system.

4. The method according to claim 1, further comprising a step of indicating to a user of the vehicle whether the charging unit is connected to the battery system.

5. The method according to claim 1, wherein the battery system is arranged to provide electric power for propulsion of the vehicle.

6. The method according to claim 1, wherein the vehicle is a forklift.

7. The method according to claim 1, wherein the first main terminal is a negative main terminal and wherein the reference point is ground.

8. The method according to claim 1, wherein the first main terminal is a positive main terminal and wherein the reference point is the positive main terminal.

9. A battery system,
    wherein the battery system comprises a plurality of battery cells, first and second main terminals connected to the battery cells, and a charging interface comprising first and second contact points connected to corresponding first and second main terminals,
    wherein the battery system is arranged onto a vehicle and configured to be connected via the first and second contact points to an external battery charging unit for charging of the battery system,
    wherein the battery system comprises a switch arranged between the first main terminal and the corresponding first contact point so as to allow disconnection of the first contact point from the first main terminal,
    wherein the battery system is provided with a voltage measurement member arranged to measure a voltage between the first contact point and a reference point having a potential substantially similar to the disconnectable first main terminal,
    wherein the battery system comprises a battery management circuitry arranged to control the switch and to receive a signal from the voltage measurement member,
    wherein the battery management circuitry is configured to determine, by comparing a value from the voltage measurement to a threshold value, whether the external battery charging unit is connected to the first and second contact points of the battery system.

10. The battery system according to claim 9, wherein the battery management circuitry is arranged to open the switch and to receive a signal from the voltage measurement member when the switch is open.

11. The battery system according to claim 9, wherein the battery management circuitry is configured to determine that the charging unit is connected to the battery system if the value from the voltage measurement exceeds the threshold value.

12. The battery system according to claim 9, wherein the battery management circuitry is further configured to limit the ability of the battery system to provide power to the vehicle if it is determined that a charging unit is connected to the battery system.

13. The battery system according to claim 9, wherein the battery management circuitry is further configured to indicate to a user of the vehicle that the charging unit is connected to the battery system.

14. The battery system according to claim 9, wherein the first main terminal is a negative main terminal and wherein the reference point is ground.

15. The battery system according to claim 9, wherein the first main terminal is a positive main terminal and wherein the reference point is the positive main terminal.

16. A vehicle comprising the battery system according to claim 9, wherein the battery system is arranged to provide electric power for propulsion of the vehicle.

17. The vehicle according to claim 16, wherein the vehicle is a forklift.

18. A battery charging system comprising the battery system according to claim 9 and a battery charging unit comprising third and fourth contact points configured to be connected to the first and second contact points, respectively, during charging of the battery system, wherein the charging unit further comprises an impedance connecting the third and fourth contact points.

19. The battery charging system according to claim 18, wherein the impedance is a resistor.

20. The battery charging system according to claim 19, wherein the resistor has a resistance in the order of 100 kOhm.

* * * * *